(No Model.) 2 Sheets—Sheet 2.
C. KALKKUHL.
GAS LAMP.
No. 502,123. Patented July 25, 1893.
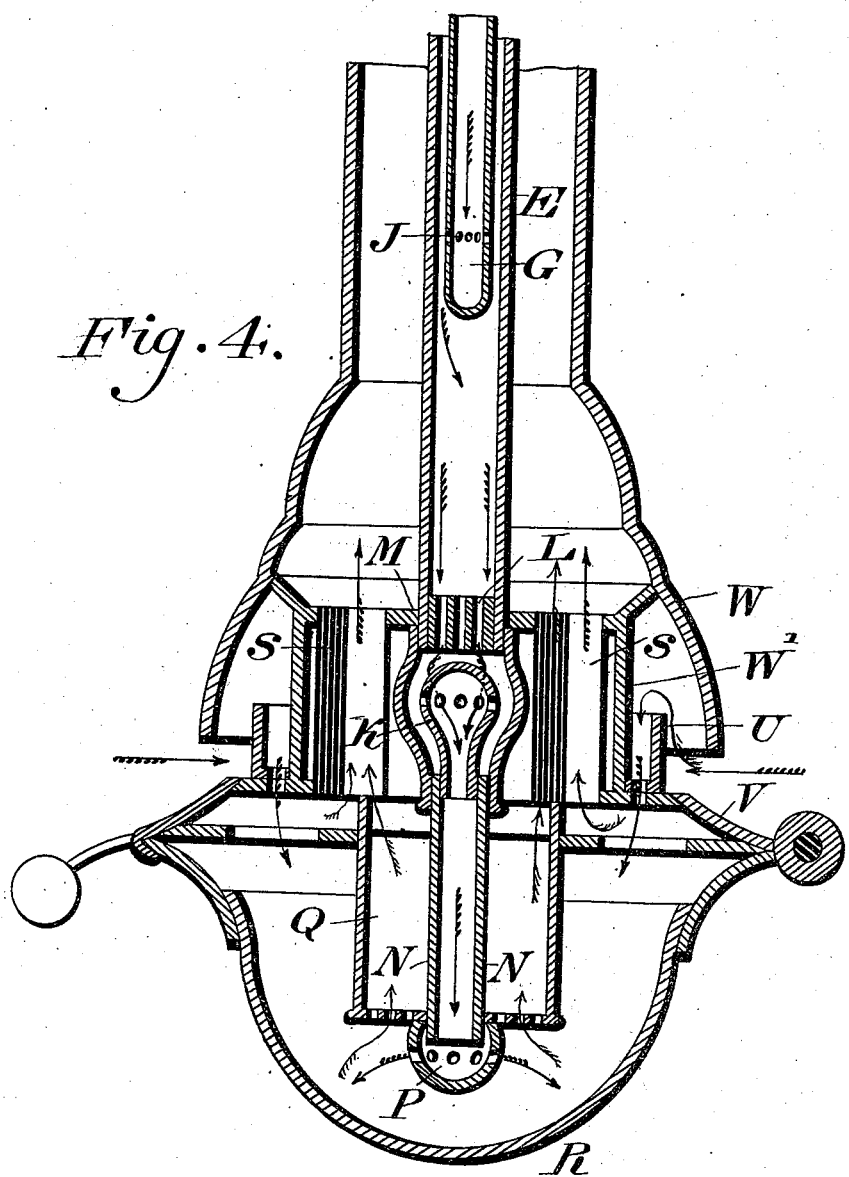
WITNESSES:
O. F. Eagles.
L. Douville.
INVENTOR
Carl Kalkkuhl
BY
ATTORNEY.

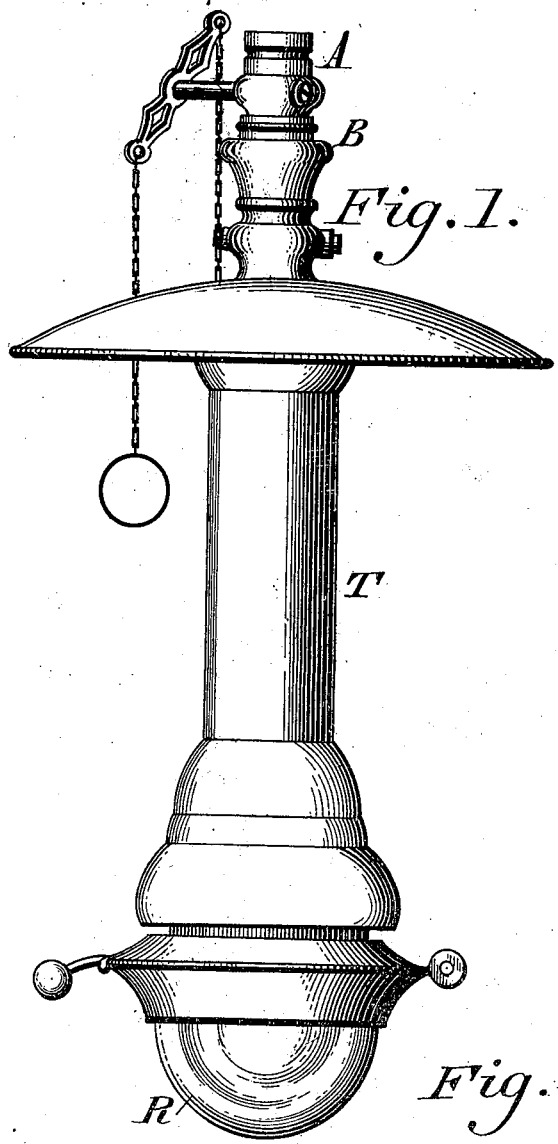
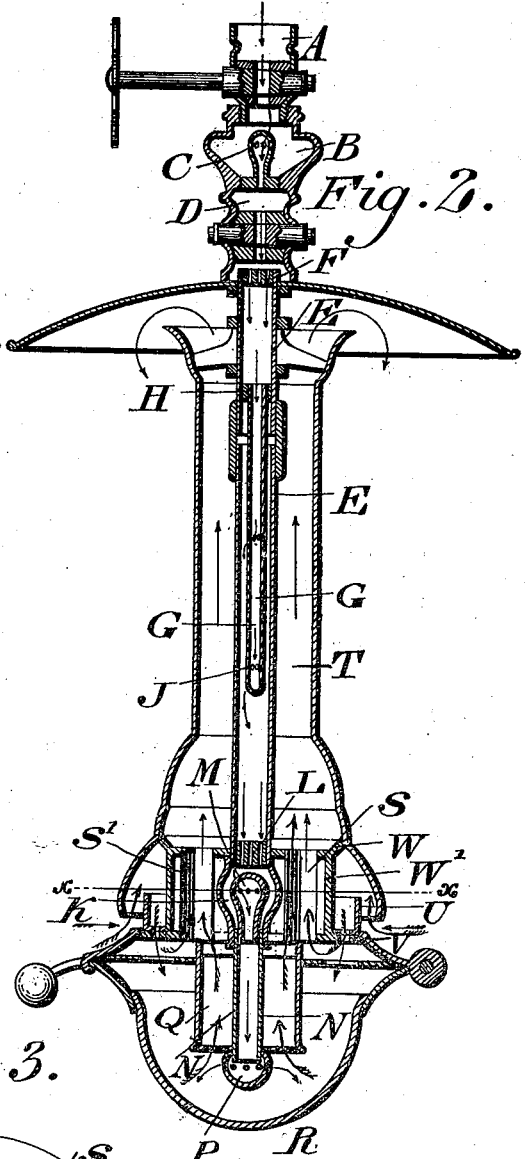

UNITED STATES PATENT OFFICE.

CARL KALKKUHL, OF PHILADELPHIA, PENNSYLVANIA, ASSIGNOR OF ONE-HALF TO SAMUEL FRANK, OF SAME PLACE.

GAS-LAMP.

SPECIFICATION forming part of Letters Patent No. 502,123, dated July 25, 1893.

Application filed August 2, 1892. Serial No. 441,919. (No model.)

*To all whom it may concern:*

Be it known that I, CARL KALKKUHL, a subject of the King of Prussia, residing in the city and county of Philadelphia, State of Pennsylvania, have invented a new and useful Improvement in Gas-Lamps, which improvement is fully set forth in the following specification and accompanying drawings.

My invention consists of improvements in gas lamps, whereby the pressure of the gas may be maintained equable, and a steady flame produced, the construction and operation of parts being hereinafter set forth.

Figure 1 represents a side elevation of a gas lamp embodying my invention. Fig. 2 represents a vertical section thereof. Fig. 3 represents a horizontal section thereof, on line x, x, Fig. 2. Fig. 4 represents a vertical section of the lower part of the burner on an enlarged scale.

Similar letters of reference indicate corresponding parts in the several figures.

Referring to the drawings: A designates the inlet pipe, below which is a chamber B, the latter containing a perforated pipe C, which communicates with said chamber B, and with a chamber D below the same.

E designates a pipe which has a perforated top F, the latter being at the base of the chamber D, and forming a communication between said chamber and the pipe E.

G designates a pipe which is located within the pipe E, and has around the top of the same a bushing H, thus closing the portion of the pipe E around said top of the pipe. In the lower portion of the pipe G are openings J, which communicate with said pipe E. Below the pipe E is a chamber K, which is separated from said pipe E by a perforated block or plate L, said chamber containing a perforated pipe M, which communicates with said chamber K, and with a pipe N below the same the lower end of the latter having a burner P connected therewith. Surrounding said pipe N is a hot air chamber Q, the lower portion whereof is perforated or open, so as to be in communication with the space within the globe R at the base of the lamp, said chamber and the burner P being within said globe, the latter being hinged to the frame of the lamp, so as to be readily opened, as usual in such cases. Above the chamber Q is an annular block S, whose periphery is slotted, forming numerous hot air passages S' which are in communication with the chamber Q, owing to the deepened lower ends of said slot being directly over and open to said chamber, and with a flue T, which is supported on the frame of the lamp and surrounds the pipe E, said flue being open at top and bottom. The bottom of said flue is widened or bell-shaped, and surrounds a cup U whose base is perforated and communicates through the perforated plate V with the interior of the globe R, it being noticed that air is admitted to the burner, as shown by the arrows Fig. 2, through the bottom of the flue T into the cup U, and from thence into the globe, it being also noticed that the flue has a separating wall W therein, whereby the fresh air is prevented from passing into the upper part of the flue.

The inner wall W' of the cup U rises from the plate V, and joins the division W, thus preventing the fresh air from directly impacting against the block S.

The operation is as follows:—Gas enters the pipe A and passes through the chamber B, pipe C, chamber D, perforated plate F, pipe E, pipe G, then again into pipe E, through the perforated plate L, chamber K, pipe M and pipe N, and so reaches the burner. The hot air enters the lower end of the flue T, passing over the outer wall of the cup, and through the perforations in the bottom of the same and the plate V, into the space within the globe, where it is heated by the flame of the burner. It then enters the chamber Q through the perforated bottom wall of the same and passes through the slots of the block S, which highly heats the same. The heated air also passes between the chamber K and said block S, as shown by the arrows, Fig. 2, thus highly heating said chamber K, the effect of which is communicated to the gas. The flue T is also heated by the products of combustion, which also pass upward through the slots of block S, into said flue, and the gas is accordingly subjected to the heat thereof as it passes through the pipe E, it being noticed that the gas is gradually heated from its entrance into the pipe E until it reaches the burner, whereby the brilliancy of the flame is vastly increased. It will also be seen that owing to the several chambers and the perforated pipes, the gas is permitted to expand, and its rapid passage is retarded, so that in the case of an increased pressure, the same is scarcely communicated to the flame, and the latter may thus be maintained equable and prevented from flickering, as the pressure is maintained uniform or nearly so.

Having thus described my invention, what I claim as new, and desire to secure by Letters Patent, is—

1. A gas burner consisting of gas conveying pipes with a burner, a surrounding flue and globe, and an inner perforated block with a surrounding cup, said flue having its top and bottom open to the atmosphere, and said cup having perforations in its bottom forming a communication between the atmosphere and the chamber surrounding the burner, said parts being combined substantially as described.

2. A gas burner having a conveying pipe, a burner at its end, a flue surrounding said pipe, a perforated block surrounding said pipe at the lower end of said flue and within the same, a cup surrounding said block, and a globe forming a chamber outside of said burner, said flue being open at top and bottom, and said cup being perforate, said parts being combined substantially as described.

3. A hot air chamber adjacent to the burner, and a flue which surrounds the gas conveying pipe, a slotted heating block around the lower gas-receiving chamber, a globe inclosing the burner, and a perforated cup which is supported above said globe, and communicates with the latter and with the lower end of the flue, said flue having a division therein, and having both ends open to the atmosphere, one end admitting fresh air through said cup into the globe, and the other serving to discharge the products of combustion and heat the pipes inclosed therein, the several parts named being combined substantially as described.

CARL KALKKUHL.

Witnesses:
JOHN A. WIEDERSHEIM,
L. JENNINGS.